FIG. I.

INVENTOR
KENNETH TINKLER
BY Young + Thompson
ATTORNEYS.

3,493,827
DIGITAL COARSE AND FINE
SERVOCONTROL SYSTEM

Kenneth Tinkler, Up Hatherley, Cheltenham, England, assignor to Telehoist Limited, Cheltenham, England
Filed May 9, 1966, Ser. No. 548,770
Int. Cl. H02p 5/00; G05b 19/32
U.S. Cl. 318—18                         13 Claims

ABSTRACT OF THE DISCLOSURE

A numerical control system for positioning an element relatively to an earlier or datum position, comprising a digital control section including pulsing means which produce a digital pulse count, and a digital counter which counts the pulses from a preset value which is related to a desired amount of movement of the element down to zero which corresponds to an element position close to a desired final position. The digital counter then provides a signal which renders an analogue control section operative to control final positioning and the digital control section includes a stepping motor which is driven by the digital pulse count. The system includes a rotary electrical transducer with two relatively movable parts one of which is connected to the stepping motor and the other of which is formed for connection to the element so as to be movable therewith, the analogue control section action to control final positioning of the element in accordance with a analogue signal from the transducer.

---

Figure 1:
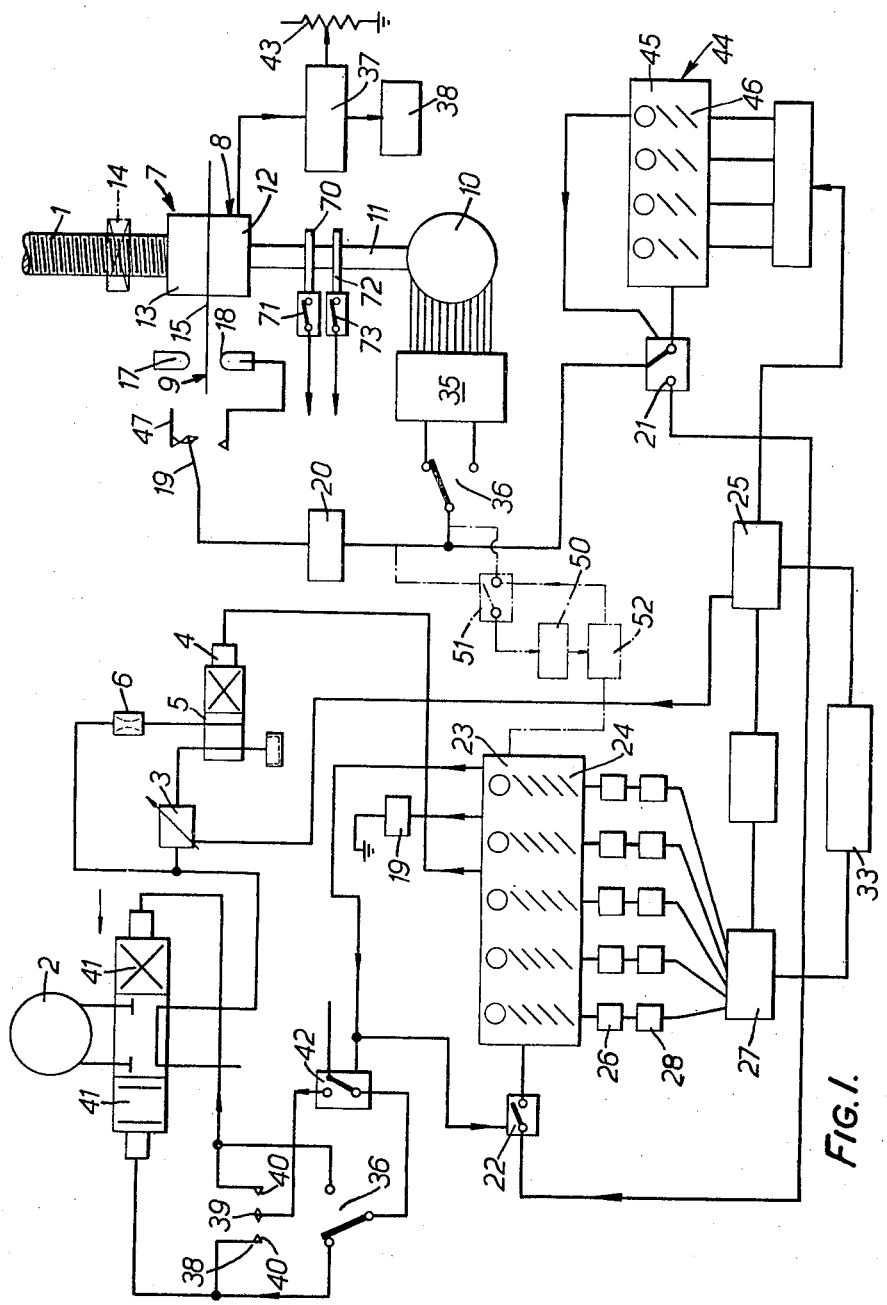

This invention relates to numerical control systems for accurately positioning an element relatively to an earlier or datum position. It is of particular advantage to numerical control systems for machine tools, especially milling machines.

Numerical control systems for machine tools at present in use are of either the analogue or the digital type. The analogue measuring systems are reliable as for any demanded measured position there is a single unique corresponding feedback point, and hence the desired position is uniquely defined. However, such systems tend to be expensive if high accuracy is required because of the need for linearity and high resolution from the measuring transducer. Digital systems employ a simpler method of measurement and it is relatively easy to obtain small measured increments, but such systems have the disadvantage of "pulse skipping." If a pulse is lost in the circuit or a pulse is injected into the circuit from an extraneous source, such as the electricity supply, a measuring error is introduced which cannot be detected or compensated.

The object of the invention is to provide a numerical control system which is particularly, though by no means exclusively, applicable to the control of machine tools and can be manufactured at a favourable cost as compared with existing systems and yet operate with extreme accuracy, advantages of purely analogue and purely digital systems being utilised and disadvantages of both largely avoided.

According to the invention a numerical control system for positioning an element relatively to an earlier or datum position comprises a digital control section which is operative during most of the measured movement of the element and an analogue control section which becomes operative for a final portion of the measured movement and acts to control final positioning of the element.

Preferably the digital section includes a counter which counts from a preset value which is related to the desired position down to zero which corresponds to an element position close to the final position, the digital counting circuit then providing a signal which renders the analogue section operative to control final positioning.

Preferably the system includes a measuring head which in use rotates in synchronism with movement of the element which is under positional control. When the control is applied to a machine tool, for example a milling machine table, the measuring head is conveniently driven from the machine lead screw at the undriven end of the lead screw. To increase the accuracy the coupling between the lead screw and the measuring head may include a backlash compensator, and the measuring head conveniently supplies both a series of pulses providing a digital count and an analogue signal for final positioning.

The digital count pulses preferably operate a stepping motor which is conveniently embodied in the measuring head the analogue signal being representative of the phase difference between the stepping motor, which follows movement of the head, and the input drive to the head.

During an initial rapid measuring period the stepping motor may be inoperative and the digital count pulses fed to a high-speed counter which resets to zero after a fixed number of pulses which corresponds to one revolution of the stepping motor, the digital counter providing a signal which results in the pulses being fed into the stepping motor and isolates the high-speed counter when the element position is close to the desired final position. This arrangement has the advantage that the speed of movement of the element over most of the range of movement is not limited by the counting speed of the stepping motor which may, for example, not be able to accept pulses at a greater speed than 100 pulses per second.

Conveniently the head incorporates a rotary induction transducer which provides the analogue signal and is connected between the input drive to the head and the stepping motor shaft; preferably the body of the transducer is directly coupled to the head input with the transducer rotator connected to the stepping motor. Thus the analogue signal is dependent on the phase difference between the transducer body, or the head input drive, and the stepping motor.

The analogue section preferably includes a demodulator the input of which is provided by the transducer output, with the demodulator output controlling final positioning of the element. The demodulator output conveniently controls a balanced armature relay the balanced position of which represents an element stationary position, unbalance in one direction or the other respectively determining the direction of movement of the element when under analogue control. This relay may be rendered operative to control final movement and positioning of the element as a result of a signal produced by the digital counting circuit when the digital count reaches zero.

Adjustable bias means are preferably provided for the demodulator in order to preset the transducer output signal which corresponds to a demodulator output signal, normally zero, corresponding to the stopped element position. The bias means may take the form of a potentiometer calibrated to cover the maximum range of the final analogue control. Preferably the lowest decade of the digital counter represents steps of 0.01 in., the full range of analogue control also being 0.01 in. and the potentiometer calibrated in units of 0.001 in.

The use of a stepping motor which follows the input drive to the measuring head has the advantage that a relatively cheap construction of stepping motor can be used, particularly when the high-speed counter is introduced, without sacrificing consistent long life and reliability, due to the output torque requirements being negligible. Thus according to a further feature of the invention a numerical control system, particularly for a machine tool, comprises pulsing means to produce a series of pulses dependent upon movement of the element to be controlled, a stepping motor controlled by the pulses and hence following movement of the pulsing means in a stepwise manner at least during final positioning of the element, transducer means providing an output signal dependent upon the phase displacement between the pulsing means and the stepping motor, means to control final positioning of the element in dependence upon the transducer output signal, and counting means to count the number of pulses applied to the motor and provide a signal rendering the positioning control means operative when the count reaches a predetermined value related to the desired final position of the element.

The system may include a high-speed counter operative to count the pulses during an initial rapid movement of the element with the stepping motor stationary, and means to switch the pulses to the stepping motor after the high-speed counter has counted a total number of pulses which is a multiple of the number corresponding to one revolution of the motor and when the element is approaching the final position. The high-speed counter may automatically reset after each multiple count. As a result the rapid initial movement of the element is not limited by the maximum pulsing rate of the stepping motor.

When the element approaches the final position (for example within 1 in.) the element conveniently slows down to provide a safe working speed for the stepping motor and when the element approaches closer to the final position (for example within 0.5 in.) on the next reset of the high-speed counter to zero the pulses are conveniently fed to the stepping motor instead of the reset counter. Thus during fast movement of the element the high-speed counter successively counts the pulses and resets to zero, the pulses being fed into the stepping motor when the element approaches the final position. Since each resetting of the high-speed counter to zero corresponds to an integral number of revolutions of the stepping motor, the effect on the stepping motor is the same as if it had been counting the pulses for the complete movement of the element.

Preferably the digital counting circuit provides a slowdown signal as the final element position is approached, for example 0.3 in. away from that position, a signal later being produced which renders the pulsing means of the head inoperative and connects in its place a rapid rate pulsing circuit. The latter signal is conveniently given at the 0.2 in. position and the rapid rate pulsing is chosen to be materially greater than the rate of pulsing at the slow-down speed of the element resulting from the earlier signal. The rapid pulsing ensures that the stepping motor which has previously followed the transducer rapidly overtakes the latter and empties the digital counter to zero. This ensures that when the analogue control becomes operative the element position lags relative to the stepping motor, i.e., it is impossible for the element to have overshot the final position when the analogue control becomes operative.

The digital counter preferably has a bank of manual switches enabling a plurality of consecutive desired positions to be set up by hand, although a tape reader may be provided for alternative tape control. The tape reader may also provide a signal controlling the normal element speed before the slowdown position is reached, and the tape reader counter setting output may be fed to storage units which enable the next count to be stored while one count is being reduced and the element correspondingly positioned.

A cutter compensator counting circuit may be included in the digital circuit, the compensator circuit being bypassed when not required. The arrangement is preferably such that with the compensator circuit operative the compensator counter has to be emptied to zero, previously being set according to the required cutter compensation, before the count commences at the main dimension indicator counter.

A method of controlling the position of an element, conveniently a table or the like of a machine tool, according to the invention comprises the steps of producing a series of pulses at a rate dependent upon the speed of movement towards the element of the desired position, counting the pulses and utilising them to drive a stepping motor, stopping pulsing when the pulse count reaches a predetermined value related to the desired final position of the element, comparing the final position of the stepping motor with the analogous instantaneous position of the element, and driving the element to the final position in dependence upon the result of that comparison.

Figure 2:
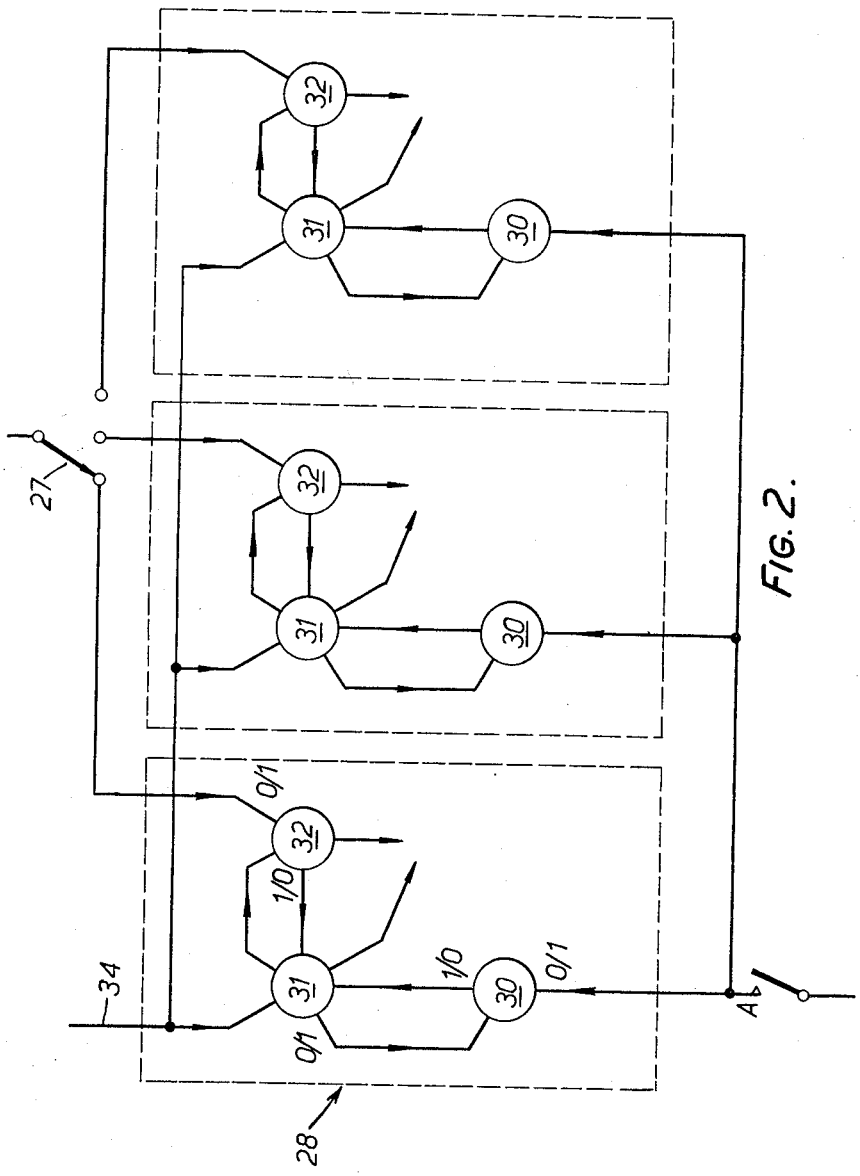
Figure 3:
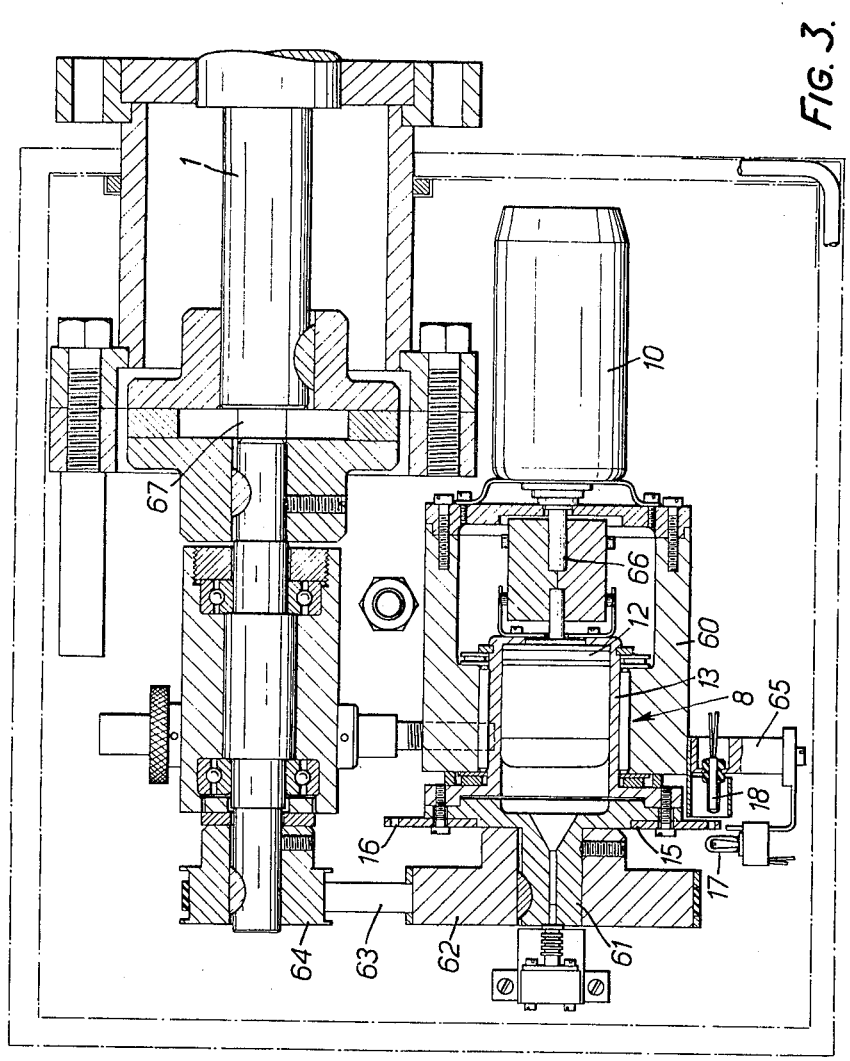

The invention will now be further described with reference to the acompanying drawings which show, by way of example, a numerical control system in accordance with the invention for use with the table of a milling machine. In the drawings:

FIGURE 1 is a schematic block diagram of the numerical control system showing a modification thereof in broken lines, FIGURE 2 is a circuit diagram of a component of FIGURE 1, and FIGURE 3 is a detail view of a component of FIGURE 1.

The table is driven by means of a lead screw 1 which is itself driven at one end by means of a hydraulic motor 2 the speed of which is normally controlled by a remotely operated flow controller 3. Hydraulic fluid is supplied to the controller 3 from a pump 4 through a changeover or "slow-speed" solenoid valve 5. When this valve 5 is changed over the controller 3 is cut out of circuit and replaced by a "slow-speed" restrictor 6 which is brought into operation for a purpose described hereinafter.

A measuring head 7 driven from the other end of the lead screw 1 comprises a rotary induction transducer 8, pulse producing means 9 and an electrically operated stepping motor 10. The shaft 11 of the stepping motor 10 is directly coupled to the rotator 12 of the transducer 8 which provides an output error signal dependent upon the phase displacement between the head input drive and the stepping motor 10. The body 13 of the transducer 8 maybe driven from the lead screw 1 through a backlash compensator 14 (shown in broken lines in FIGURE 1) which can be adjusted to provide a backlash identical with that of the driving nut of the table, and the body of the stepping motor 10 is fixed. Instead of the mechanical backlash compensator 14, backlash compensation may be achieved electrically by injecting a suitable compensating signal into the system.

The pulse producing means 9 drives the stepping motor 10 and comprise a circular pulsator disc 15 which is fixed to the transducer body 13 so as to rotate therewith and has a ring of holes 16 close to the disc periphery. A light source 17 is situated on one side of the disc 15 on the pitch circle of the holes 16 and in alignment with a photocell 18 which thus produces a pulse each time a disc hole 16 passes between the light source 17 and the photocell 18. The number of holes 16 is chosen, in conjunction with a gear ratio of the head input drive, to suit the particular lead screw pitch and provide one pulse for each 0.01 in. movement of the machine table.

The photocell 18 is connected through the normally closed contacts of a pulse changeover electronic relay 19 to a pulse shaping circuit 20, the output of which is connected through a compensator changeover electronic switch 21 and a dimension counter "on-off" electronic switch 22 to an electronic dimension indicator counter 23 of the count-down type. The counter 23 has four operative decades and is set up to a direct reading dependent upon the distance through which the table is to be moved by the control system, thus providing a maximum digital control movement of 99.99 in. If a greater movement than this is required one or more additional decades can be added to the counter. The counter can be set up by means of a bank of manual switches 24 which enable four consecutive counts to be preset, or automatically when tape control is employed.

For use with tape control the system incorporates a tape reader unit 25 which provides a feed control signal for the flow controller 3, thus controlling the speed of normal table movement, and a counter setting up signal controlled by a scanning uniselector 27 which sets up the counter 23. The counter 23 has an additional indicated but inoperative decade providing units of 0.001 in., and each decade is associated with a storage unit 28 which stores information for the next setting up operation whilst one table movement is being effected. The stored information is passed through a binary decimal decoder 26 before entering the counter 23. This arrangement allows a slow tape reading speed to be employed with a material increase in the life of the tape.

The counter setting up information is fed into the tape reader 25 in binary form on punched tape, i.e. each decimal digit is represented by four binary digits ($2^3$, $2^2$, 2, 1), the binary condition being defined by a punched hole in the tape or no punched hole in the tape. Each binary digit is called a "key" and for the storage of one decimal digit four memory circuits are necessary each storing a binary digit, the four memory circuits constituting a memory card.

Referring to FIGURE 2 which shows three memory cards (in broken lines) for one tape key only, each card comprises three transistors 30, 31, and 32, the input and output relationships being shown in conventional binary form in each case. The information from the tape reader is supplied to transistor 30 through terminal A and the scanning uniselector 27 injects a scanning signal into each card in turn. The uniselector 27 is operated by a drive unit 33 which also operates the tape reader so that the uniselector scans the cards in accordance with the information read by the tape reader. The four tape keys are connected in parallel to every card so that a signal from the tape reader is injected into transistor 30 each time the tape moves. The two circuits interconnecting transistors 30, 31 and 31, 32 respectively are only latched when the output of transistor 31 is at a "1" so that transistors 31 and 32 of a particular card and key only store information fed from the tape reader while that card is being scanned by the uniselector 27. Also, once the card has been scanned and information fed in, no change can take place until the circuit is reset by means of a reset line 34 connected to transistor 31. The stored information (in the form of signals from transistors 31 and 32) is fed to the decoders and then to the dimension indicator counter 23. When tape control is not employed the flow controller 3 can be preset manually to provide the desired table speed.

The pulses from the shaping circuit 20 not only operate the counter 23 but are fed to a driver unit 35 for the stepping motor 10 through one set of contacts of a changeover direction control switch 36 the position of which determines whether a pulse drives the stepping motor 10 in one direction or the other according to the direction of table movement. Ganged contacts of the same switch 36 control valve operation of the hydraulic motor 2 so that the latter drives the table in the correct direction.

The output of the rotary transducer 8 is fed to a demodulator 37 the output of which controls a valve-operating relay 38 with a balanced centre contact 39 associated with side contacts 40 which are respectively contacted to energise two directly controlled solenoid valves 41 of the hydraulic motor 2. When the centre contact 39 of this relay 38 is floating between but out of contact with the side contacts 40 the hydraulic motor 2 is stationary. A valve solenoid operating voltage is supplied to the valve operating circuit, comprising the contacts of the valve operating relay and the corresponding contacts of the direction control switch, through a digital/analogue changeover electronic switch 42. In the resting position of the latter switch 42 the operating voltage is applied to the direction control switch contacts and hence the valve operating relay 38 is ineffective, the latter contacts and the relay contacts being disposed in parallel.

A "demand 0.001 in." potentiometer 43, which is set to correspond to the fifth or inoperative indicating decade of the counter 23 provides a bias signal for the demodulator 37 which is related to the magnitude of the rotary transducer signal. The relationship is such that the bias applied to the demodulator 37 with a setting of 0.001 in. on the potentiometer corresponds to and biasses out the transducer signal resulting from a transducer phase displacement corresponding to 0.001 in. movement of the table.

A cutter compensator circuit 44 is included which, like the tape reader, can be switched out unless required. Under tape control the tape reader 25 controls switching of the compensator circuit 44. The compensator circuit 44 employs a four decade count-down counter 45 which can be set up to provide a reading corresponding to the desired cutter compensation. This counter is again provided with switches 46 for manual setting up of a series of consecutive counts, although for tape control a selector circuit, which controls setting up of the compensator counter 45, is controlled by a signal from the tape reader 25. The compensator changeover electronic switch 21 which is fed by the shaping circuit 20 connects the latter, in the normal switch position, with the compensator counter input. This counter 45 when empty provides a signal which changes over this electronic switch 21 so that the shaped pulses are thereafter supplied to the dimension indicator counter 23 which thus only becomes operative after the desired cutter compensation has been effected.

Operation of the device, assuming that the desired table movement has been set up on the dimension indicator counter 23 and the necessary cutter compensation has been set up on the compensator counter 45, is as follows. The hydraulic motor 2 turns the lead screw 1 and moves the table at the prescribed speed under the control of the flow controller 3, which has been preset manually or by a signal from the tape reader 25. The direction of lead screw rotation and hence table movement depends on the setting of the direction control switch 36. In addition to moving the table the lead screw 1 turns the rotary transducer 8 through the backlash compensator 14 with corresponding rotation of the pulsator disc 15.

The pulses from the photocell 18 are fed through the normally-closed contacts of the pulse changeover relay 19 and the shaping circuit 20 to the compensator counter 45 which is emptied pulse by pulse. When empty this counter 45 provides a signal which changes over the compensator changeover switch 21 so that the pulses are now fed through that switch and the dimension counter switch 22 to the dimension indicator counter 23 which is emptied pulse by pulse to zero. Each pulse also steps on the stepping motor 10 so that the number of steps by the motor 10 is equal to the total number of pulses. Thus the stepping motor 10 follows movement of the machine table and at any time the error signal from the rotary transducer 8 should remain within small limits. As the digital/analogue changeover switch 42 is in the normal position, in which the valve operating relay contacts 40 are inoperative, the error signal from the rotary transducer 8 is completely ineffective. Thus phase displacement between the lead screw 1 and stepping motor 10 has no effect on the lead screw drive, the stepping motor 10 merely keeping generally in step with the lead screw 1.

When the dimension indicator counter 23 is emptied to a reading corresponding to a dimension of 0.3 in. away from the final position, the counter circuit provides a slowdown signal which operates the slow-speed solenoid valve 5 which brings into operation the aforesaid slow-speed restrictor 6 in place of the flow controller 3. Thus the table slows down to a suitable speed which will avoid overshooting when the final position is reached. For example fast normal table movement may be employed with a slow approach speed of about 3 ins. per minute or less. Operation now continues as before with the slower speed of table movement.

When a counter reading corresponding to a table position 0.2 in. from the final position is reached the dimension counter circuit provides a signal which operates the pulse changeover electronic relay 19, the contacts of which are changed over to disconnect the photocell 18 from the shaping circuit 20. The latter contacts now connect the shaping circuit 20 to a pulsing circuit 47 which provides pulses at a rapid rate of one hundred pulses per second, i.e. at a rate much greater than that resulting from rotation of the pulsator disc 15. As a result the dimension indicator counter 23 is rapidly emptied to zero and the stepping motor 10 is driven ahead of the lead screw 1. At zero count the counter circuit produces a signal which changes over the digital/analogue changeover switch 42 and renders the valve operating relay contacts 40 into operation. This signal also isolates the input of the stepping motor driver unit 35 so that no further information is fed to the stepping motor 10.

The valve operating relay 38 now controls the hydraulic motor 2 which will continue table movement at the slow approach speed under analogue control as long as there is a demodulator output signal. Due to the previous fast pulsing of the stepping motor 10 the lead screw 1 and the body 13 of the rotary transducer 8 have to catch up, and table movement continues in the same forward direction as before until the error signal from the rotary transducer 8 corresponds to the setting of the demand 0.001 in. potentiometer 43. At this lead screw position the demodulator output becomes zero and the contacts 40 of the valve operating relay 38 are open and the hydraulic motor 2 stops. Indicator lights are provided which inform the operator that the positioning operation is now complete.

It will be seen from the foregoing description that the control system employs a digital counting and control section in which over most of the movement the stepping motor 10 follows the machine table, and an analogue section controlling movement over the last small fraction of an inch with the machine following the previous movement of the stepping motor 10 under the control of the valve operating relay 38. As the final position is under analogue control it will be found that in many cases clamping of the machine table is unnecessary as the table is held in position by a closed loop system and the final position is held. Any movement of the table from the final position will produce an analogue control voltage from the rotary transducer 8 which will operate the valve operating relay 38 to produce a correction movement of the table.

The arrangement has one big advantage in that all table movement need not be measured from a common datum which is a requirement of a normal truly analogue system. As the dimension required is in the form of a digital count which is gradually emptied to zero within the counter each measurement in the present system is truly additive, i.e. any error is not cumulative. As analogue measurement and control is only over a very small final range it can be achieved very accurately in an exceptionally simple and cheap manner. The method employed of emptying the count in the dimension indicator counter 23 of the digital section to zero has a very definite advantage in that the signals produced at the 0.3 in., 0.2 in. and zero position counts, and which are utilised for signalling purposes in the manner described, always occur at the same position so far as the counting circuit is concerned. If measurement were taken from a datum with an increase in count during table movement the corresponding signalling points would differ for each measurement and the electronic circuitry necessary to produce the signals at the correct times would be extremely complex and correspondingly costly with a lower degree of reliability.

It will be seen that the described system utilises the advantages of a digital follow up system which covers most of the table movement and also the advantages of an analogue system for final positioning acting through the valve operating relay contacts which only become operative when the digital count is completed, i.e. within the last 0.01 in. of movement. One of the main disadvantages of prior digital systems is pulse skipping; if a pulse is missed from the measuring head or if an extraneous pulse is injected from the mains electricity supply the final measurement is normally incorrect by a corresponding amount representing an error which cannot be detected or compensated. With the present arrangement the driver unit 35 of the stepping motor 10 is pulsed from the shaping circuit 20 which is physically combined with the counter circuit itself so that a missed pulse from the measuring head or an extraneous pulse injected from the mains will have no effect on the final count as the stepping motor 10 and the counter remain in step. Although an extraneous pulse, for example, will cause the stepping motor 10 to lead the lead screw 1 by a angle corresponding to one pulse during table movement this has no effect on the final measurement; it merely increases the error signal fed to the demodulator 37 from the rotary transducer 8 which controls final positioning.

The backlash compensator 14 (shown in broken lines in FIGURE 2) through which the rotary transducer body 13 may be coupled to the lead screw 1 incorporates a variable "dead-band" mechanism which can be adjusted to have the same free angular movement as the backlash of the table drive. Thus the free movement and the table backlash will be taken up at the same time so that the measuring head 7 commences to measure at the instant the table commences to move. This clearly does not correct for a variable backlash but it is sufficient to enable a medium quality machine tool to perform reasonably accurate machining. If extreme accuracy is required, and any backlash or other variables in the table drive must be eliminated, the measuring head 7 can be driven by means of a high quality rack and pinion drive attached to the machine bed or table instead of from the lead screw 1. The accuracy of measurement by the head 7 then depends solely on the accuracy of the tooth form of the rack and pinion.

If desired it is possible to compensate for a variable pitch error in the lead screw 1 even though the measuring head 7 is driven from one end of the lead screw 1 in the normal manner, and this is possible because the final positioning results from analogue rather than digital measurement. This can be accomplished by attaching to the machine a template or cam which is profiled to correspond to the variable pitch error of the lead screw and which controls a simple rotary potentiometer the output voltage of which is at all times proportional to the instantaneous positional error of the table due to the pitch error of the lead screw. This potentiometer voltage can be suitably fed into the analogue control circuit to control the demodulator output accordingly.

The use of a dimension indicator counter 23 of the countdown type which empties to zero as the final measured position is approached has, in addition to the advantages already described, the advantage that the reading always indicates the distance still to be moved before rapid pulsing commences. This is particularly convenient in many instances as it enables the machine operator, by glancing at the counter, to ascertain at any instant whether table movement is almost complete or not.

The usual start-stop, emergency stop and interrupt cycle switches are built into the described circuits at suitable positions.

In a modified construction shown in broken lines in FIGURE 1 a high-speed automatically resetting counter 50 is connected between a two-way switch 51 and a gate 52, the two-way switch 51 and gate 52 feeding the pulses from the pulsing means either into the high-speed counter 50 or into the stepping motor 10, respectively. During the major part of the traverse of the table the pulses from the measuring head are fed to the counter 50 and the dimension indicator counter 23 but not to the stepping motor 10. The counter 50 counts 48 pulses and then resets to zero, the 48 pulses corresponding to one revolution of the stepping motor 10 which remains stationary. When the dimension indicator counter 23 shows that the table is within 1 in. of the final position, the speed of traverse is set at 30 ins. per minute and when the dimension indicator counter 23 shows that the table is within 0.5 in. of the final position, the next time that the counter 50 reaches zero the gate 52 is opened thus allowing pulses from the counter 23 to reach the stepping motor 10. By this means the initial rapid traverse speed of the table is not limited by the counting speed of the stepping motor 10 since the high-speed counting is done on the counter 50. On approaching the final position the pulses are fed into the stepping motor 10, so that the effect on the stepping motor 10 is the same as if every pulse had stepped on the motor.

Datum setting of the table at one end of the machine bed, and positioning of the table at the other end of the bed for automatic tool changing if this is desired, can be achieved very simply by means of microswitches and without using the counting circuits. This is not necessary with the rapid traverse which can be achieved using the high-speed counter 50. The microswitches are conveniently used at each end of the bed, one to slow down the table and the other to control stopping of the table close to the final end position thereof, and final positioning may be achieved by utilising the rotary transducer signal and the analogue positioning circuit to bring the table to the accurate datum or tool changing position. To enable the manner in which this can be accomplished to be understood the construction of the measuring head will now be described in greater detail.

The head 7 has an outer tubular casing 60 which is fixed to the machine bed immediately below the corresponding end of the lead screw 1 with its longitudinal axis parallel thereto. The body 13 of the rotary transducer 8 is rotatably mounted within the casing 60 at one end thereof from which it projects for attachment of the pulsator disc 15 which is bolted to one end of the transducer body 13. The disc 15 has a projecting central shaft portion 61 on which is mounted a pulley wheel 62 which is connected through a toothed belt drive 63 to a further pulley wheel 64 which is connected to one end of the lead screw 1 through a flexible coupling 67. The pulley wheel 62 and further pulley wheel 64 are in the form of change-wheels which can be changed to vary the drive ratio to suit the lead screw, or if the lead screw is changed. This ratio must as described be such that one pulse from the pulsator disc corresponds to 0.01 in. movement of the table.

A bracket 65 attached to the casing 60 carries the light source 17 and aligned photocell 18 which are respectively disposed on opposite sides of the pulsator disc 15. The body of the stepping motor 10 is bolted to the opposite end of the casing 60 and the motor shaft 11 is directly coupled to the rotator 12 of the transducer 8. When a high-speed counter is not employed a pin (not shown) is provided which projects radially from the coupling and cooperates with a projection from the transducer body 13. With a zero transducer output the pin is disposed diametrically opposite the projection, the pin and projection engaging to prevent the body 13 and rotator 12 becoming somewhat less than 180° out of phase. When driving the table to the tool changing position, or back to the initial datum position at the other end of the bed, with the counting circuit inoperative the head 7 is driven with the transducer rotator 12 and the motor shaft 11 in effect locked to the transducer body 13 through the pin and projection which provide a direct drive. Thus the transducer body 13 and rotator 12 cannot get more than 180° out of the phase which would affect the accuracy of subsequent measurement.

The projection is so formed that when the transducer rotator 12 is driven by the projection through the pin the stepping motor 10 lags the transducer body 13, and hence the pulsator disc 15, by an angle corresponding to an exact number of pulses. For example, in one particular construction in which the pulsator disc 15 provides forty-eight pulses per revolution the projecting pin contacts the projection when the stepping motor 10 lags the pulsator disc 15 by the eqiuvalent of twenty-three pulses.

The transducer rotator 12 used produces an output signal representing two complete cycles per revolution of the rotator 12 relatively to the body 13, and hence the output is only of the correct polarity for control purposes if the phase difference between the transducer body 13 and rotator 12 does not exceed 90°. Under normal control it is possible that the rapid pulsing after the 0.2 in. position signal from the counting circuit will drive the stepping motor 10, and hence the rotator 12, in advance of the transducer body 13 by an angle exceeding 90°. If the transducer output signal fed to the demodulator 37 were now relied on for positioning the direction of movement of the element being positioned would be reversed away from the desired position, and to avoid this happening a cam 70 connected to the rotary 12 cooperates with a microswitch 71 on the body 13 of the transducer 8. This microswitch 71 is actuated if the phase angle between the body 13 and rotator 12 exceeds 70°, this providing a safety margin of 20°, and actuation of the microswitch 71 acts to provide an auxiliary input signal to the demodulator 37 which completely swamps the transducer output signal and is of the same polarity as the signal provided by the transducer 8 if 90° phase displacement is not exceeded. Thus when the analogue control becomes operative the auxiliary swamping signal ensures that the valve operating relay operates in the correct direction until the transducer phase displacement is once more less than 70°. The microswitch 71 then becomes inoperative and control is exercised in dependence upon the normal transducer output signal.

The tool changing position is accurately set up as follows, starting from the measuring datum position which is defined by drilling or otherwise marking the machine bed. A measurement is set up on the dimension indicator counter 23 which is more than the measurement from the datum to the tool changing position by the number of pulses by which the stepping motor 10 lags the transducer body 13 when driven thereby through said projection, i.e. twenty-three pulses in the example given. The table is now moved under the control of the control system which thus brings the table to within 0.23 in. of the tool changing position in the given example. The stopping microswitch (not shown) is now set so that it is just operating and the slowdown microswitch (not shown) is set just before it. For future movement to the tool changing position the table can be allowed to run free, i.e. not under the control of the control system, with the microswitches operative to slow down and stop the table. As the table movement takes place without the stepping motor 10 operative the transducer rotator 12 is driven from the body 13 through the pin and projection. This results in an error signal from the transducer 8 and the analogue control circuit is rendered operative by means of the stopping microswitch so that the analogue section acts to produce final positioning of the table at the tool changing station.

When the stopping microswitch is actuated by the associated cam to render the analogue control circuit operative the phase displacement of the transducer 8 is greater than 70° and so the swamping signal is fed to the demodulator 37. Normally the sign of this signal would be such as to drive the element forward to the final position, whereas due to the stepping motor 10 lagging when driven by the transducer 8 the machine table has to reverse to the desired tool changing position by a distance corresponding to twenty-three pulses. Thus the stopping microswitch not only acts to render the analogue control circuit operative but also acts to change the sign of the input signal to the demodulator 37, with the result that the normal direction of control of the analogue circuit is reversed. Thus the table moves back a distance corresponding to twenty-three pulses, i.e. until a zero transducer signal is obtained, and hence to the correct tool changing position.

To control accurate positioning of the table at the datum position and rapid free movement of the table to that position the two microswitches at the corresponding end of the table can be similarly set up, the setting up movement of the table being accomplished with the appropriate counter setting starting from the already set tool changing position. This will bring the table back to the originally accurately marked datum position.

During normal control and before the rapid pulsing after the 0.2 in. point the stepping motor 10 follows the pulsator disc 15 closely, and a large phase difference in either direction indicates a fault condition. To provide an indication of this a further cam 72 which turns with the transducer rotator 12 is associated with a fault microswitch 73 mounted on the transducer body 13 and is conveniently set to operate and indicate a fault position if the lag or lead reaches 120°. Operation of the fault microswitch 73 can act to provide a visible and/or oral fault signal and preferably acts to stop the machine. A phase displacement of 180° may be caused by the stepping motor 10 during rapid pulsing which, with rapid pulsing from the 0.2 in. point represents twenty rapid pulses before the dimension indicator counter 23 is emptied to zero.

In the modification employing the high-speed counter 50 for rapid traversing, at each zero of the high-speed counter 50 a pulse is given out which initiates the fault microswitch 73 so that if for any reason pulses have been missed from the measuring head 7 or extra pulses fed in from transients, then there would normally be an error between the microswitch 73 which rotates with the transducer body 13 and the further cam 72 which is stationary during high speed traversing. By this means a continual check is kept each time the high-speed counter 50 resets to zero.

With the described example of forty-eight pulses per revolution 120° represents sixteen pulses and hence this angle of lead can be exceeded as the result of the rapid injection of twenty pulses. As this does not represent a fault condition the signal provided by the counter circuit at 0.2 in. point not only initiates rapid pulsing but also controls a circuit associated with the fault indicating microswitch 73 so that the latter does not indicate a fault condition even though the angle of lead is greater than 120°, but inhibits further rapid pulsing until the angle of lead is less than 120°. If the analogue control becomes operative while the phase lead is still greater than 70° the first microswitch 71 on the transducer body 13 is initially operative to feed the described swamping signal to the demodulator.

Although the system has been described as controlling a hydraulic drive with normal solenoid valve control of the hydraulic motor 2 it will be appreciated that any other suitable form of drive can be employed. For example, a hydraulic drive could be used with a hydraulic motor 2 controlled by an electro-hydraulic servo-valve and amplifier providing the additional advantages of more precise and proportional speed control than with the described flow controller. With this arrangement truly proportional position control can be achieved during the analogue control phase. The described relay arrangement could be used, for example, with an electrical drive.

A still further advantage of the described system is that although the digital section utilises a stepping motor 10, which follows movement of the lead screw 1, a smooth lead screw drive is obtained as the digital count has no influence on speed control.

I claim:
1. A numerical control system for positioning an element relatively to an earlier or datum position, comprising a digital control section including pulsing means which produce a digital pulse count, and a digital counter which counts the pulses from a preset value which is related to a desired amount of movement of the element down to zero which corresponds to an element position close to a desired final position, the digital counter then providing a signal which renders an analogue control section operative to control final positioning, wherein the digital control section includes a stepping motor which is driven by the digital pulse count from the pulsing means and the system has an electrical transducer with two relatively movable parts one of which is connected to the stepping motor and the other of which is formed for connection to the element so as to be movable therewith, the digital control section also including a rapid rate pulsing circuit which, when the pulse count reaches a predetermined value related to a desired final position of the element, is automatically connected to the stepping motor in place of the pulsing means so as to cause the stepping motor to be driven ahead of the element, the analogue control section acting to control final positioning of the element in accordance with an analogue signal from the transducer.

2. A system according to claim 1, wherein the pulsing means are driven by the element to be positioned so that the digital count pulses are produced at a rate which corresponds with the instantaneous speed of movement of the element.

3. A system according to claim 2, wherein the stepping motor and the transducer are of the rotary type.

4. A system according to claim 3, wherein the pulsing means comprise a perforated pulsator disc connected to said other part of the transducer, the pulses being produced by photoelectric means.

5. A system according to claim 4, wherein the digital count pulses are initially fed to a high-speed counter which resets to zero after a fixed number of pulses which corresponds to an integral number of revolutions of the stepping motor which remains stationary while the pulses are fed to the high-speed counter, the digital counter providing a signal which feeds the pulses into the stepping motor and isolates the high-speed counter, as the latter resets, when the element position is close to the final position.

6. A system according to claim 1, wherein the analogue control section includes a demodulator an input of which is provided by a transducer output signal, with an output of the demodulator controlling final positioning of the element.

7. A system according to claim 6, wherein the demodulator output controls a balanced armature relay a balanced position of which represents an element stationary position, unbalance in one direction or the other respectively determining the direction of movement of the element when under analogue control.

8. A system according to claim 7, wherein the relay is rendered operative to control final movement and positioning of the element as a result of a signal produced by the digital counter when the digital pulse count reaches zero.

9. A system according to claim 6, wherein adjustable bias means are provided for the demodulator in order to preset the transducer output signal which corresponds to a demodulator output signal, normally zero, corresponding to the stopped element position.

10. A system according to claim 9, wherein the bias means take the form of a potentiometer calibrated to cover the maximum range of the final analogue control.

11. A system according to claim 10, wherein a lowest operative decade of the digital counter represents steps of 0.01 in., the full range of analogue control also being 0.01 in., and the potentiometer being calibrated in units of 0.001 in.

12. A method of automatically positioning an element, comprising the steps of producing a series of pulses, counting the pulses by means of a digital counter and utilising them to drive a stepping motor, providing a series of rapid rate pulses when the pulse count reaches a predetermined value related to a desired final position of the element to cause the stepping motor to move ahead of the element, comparing a final position of the stepping motor with an analogous instantaneous position of the element by means of a transducer and driving the element to the final position in dependence upon the result of that comparison.

13. A method according to claim 12, wherein the digital counter produces a slow-down signal before the series of rapid rate pulses are fed to the stepping motor, the slow-down signal reducing the speed of movement of the element.

References Cited

UNITED STATES PATENTS

| | | |
|---|---|---|
| 2,785,353 | 3/1957 | Fenemore. |
| 3,051,942 | 8/1962 | Galman. |
| 3,063,311 | 11/1962 | Beckwith et al. |
| 3,098,187 | 7/1963 | Sciaky. |
| 3,323,030 | 5/1967 | Inaba. |
| 3,324,364 | 6/1967 | Caruthers. |
| 3,370,289 | 2/1968 | Hedgcock et al. |
| 3,378,741 | 4/1968 | Sutton. |

THOMAS E. LYNCH, Primary Examiner

U.S. Cl. X.R.

90—58; 318—28